Aug. 23, 1966  J. B. LONG  3,268,060
BELT CONVEYOR SYSTEM
Filed Sept. 3, 1964  5 Sheets-Sheet 1
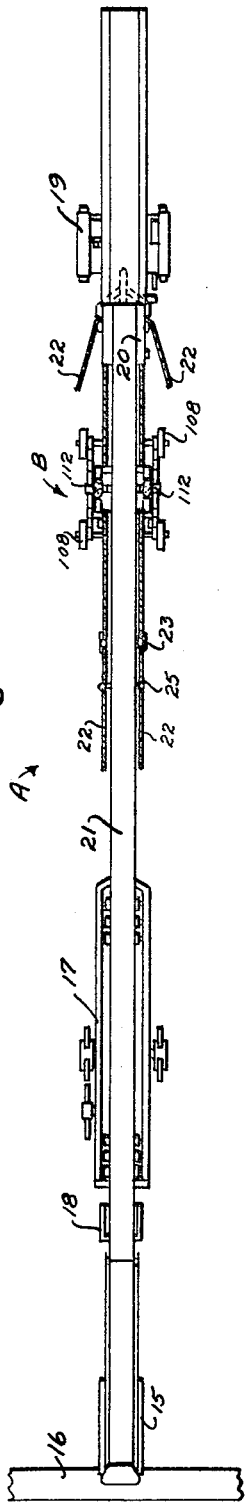
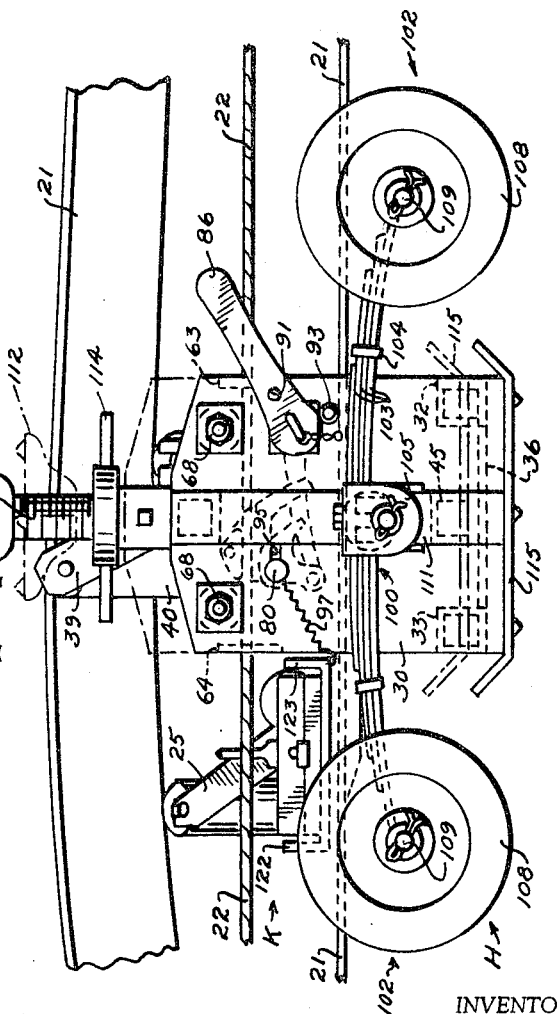
INVENTOR
JOHN B. LONG.
BY
ATTORNEYS Aug. 23, 1966  J. B. LONG  3,268,060
BELT CONVEYOR SYSTEM
Filed Sept. 3, 1964  5 Sheets-Sheet 2
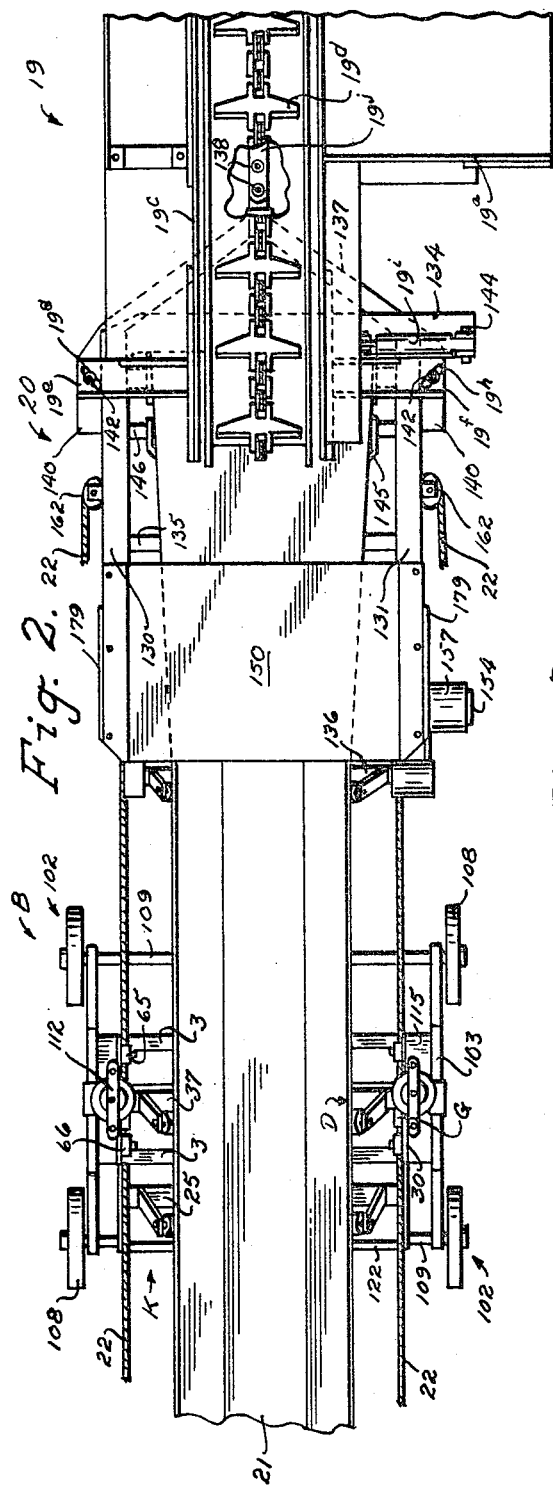
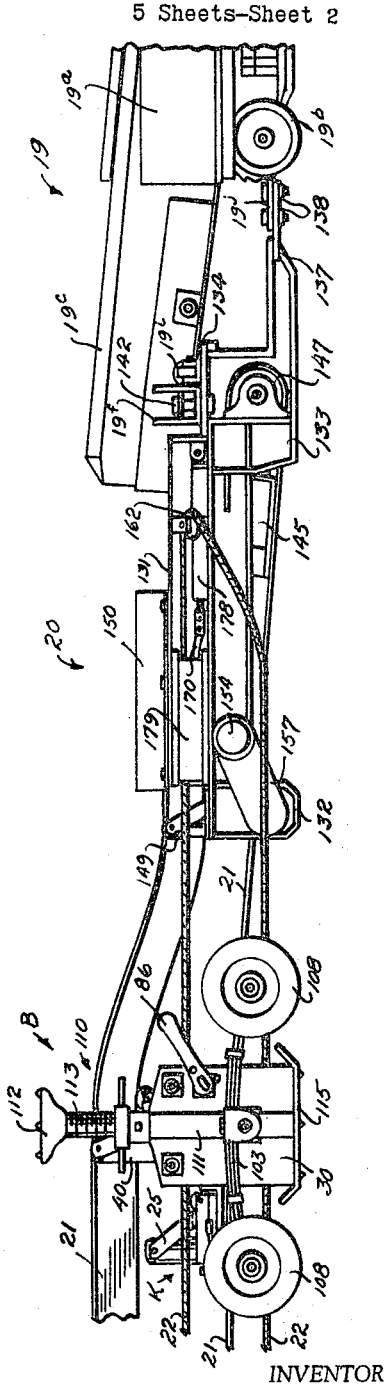
INVENTOR
JOHN B. LONG
BY
ATTORNEYS

INVENTOR
JOHN B. LONG.

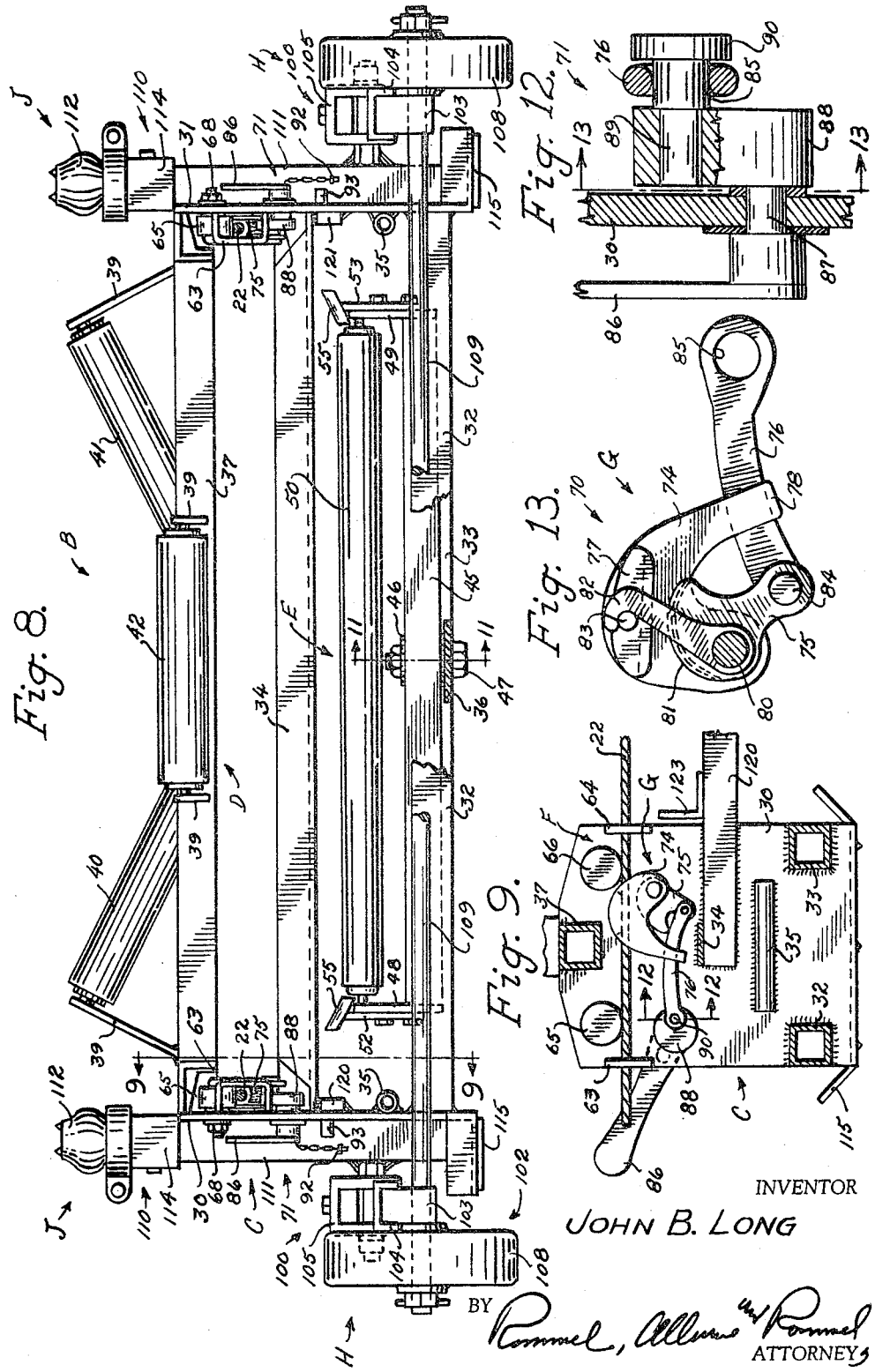

Aug. 23, 1966    J. B. LONG    3,268,060
BELT CONVEYOR SYSTEM
Filed Sept. 3, 1964    5 Sheets-Sheet 5

INVENTOR
JOHN B. LONG
BY Rommel, Allen and Rommel
ATTORNEYS

United States Patent Office 3,268,060
Patented August 23, 1966

3,268,060
BELT CONVEYOR SYSTEM
John B. Long, Oak Hill, W. Va., assignor to Marmon-Herrington Company, Inc., Oak Hill, W. Va., a corporation of Indiana
Filed Sept. 3, 1964, Ser. No. 394,278
10 Claims. (Cl. 198—139)

This invention relates generally to improvements in belt conveyor systems and more particularly to improvements in strand supported belt conveyor systems such as illustrated in the Long and Clay Patent No. 2,896,774, dated July 28, 1959.

In this type of conveyor, a pair of generally parallel flexible strands are provided along the conveyor path, which strands are supported at intervals by standards or other supporting means. A plurality of carrying idler rollers are hung on the strands at spaced intervals to form a bed for the conveying reach of the conveyor belt. A plurality of idler rollers for supporting the return reach of the conveyor belt are provided at spaced intervals along the conveyor path.

This type of conveyor is particularly adaptable for use in connection with extensible belt conveyor systems such as that illustrated in my copending application Serial No. 349,382, filed March 4, 1964.

Extensible conveyor systems of this type are particularly valuable in continuous mining operations, in which a "continuous miner" is advanced and retracted to different mining positions and a conveyor is provided for receiving the material discharged from the "continuous miner." Such conveyor systems usually include a head section, a tail section spaced apart from the head section, a conveyor extending between the head section and the tail section, and a belt storage unit. The head section is normally stationary, being positioned at a conveyor unloading point; the tail section movable as the "continuous miner" or other loading apparatus is advanced or retracted, providing a conveyor loading point adjacent the area which is being worked; and the belt storage unit operational to feed or retract belt as the conveyor system is lengthened or shortened.

When a strand supported conveyor is used in connection with such extensible system, the strands of the conveyor are normally "tied off," usually by some ground attached means, adjacent the head and tail sections. It is obvious that, as the tail section is advanced, in accordace with the mining of the working face, it is not feasible to put in additional "tied off" lengths of strands for each increment of advancement of the tail section. Neither is it feasible, with present equipment, to advance the ground attached tie-off points of the strand adjacent the tail section with each increment of advancement of the tail section. On the other hand, the belt storage units of such extensible conveyor systems usually carry a supply of belt of sufficient length so that the tail section may advance distances of fifty feet or more before it is necessary to stop the conveyor and add a new length of belting. It is apparent that the conveyor would be inoperable if it included fifty feet or more of unsupported belting in its conveying reach.

It has been proposed to resolve this problem of strand extension and strand tension by various forms of hydraulic systems mounted upon the tail section, tension being maintained on the strands by such hydraulic system and the strands paid out or retracted in accordance with advancement or retraction of the tail section. A typical illustration of such equipment is set forth in U.S. Patent No. 2,858,932, dated November 4, 1958. In a tail section of this type of equipment, belt drag or tension acts through the tail section and strand tension is required to be provided through the tail section in such a manner as to prevent collapse of the conveyor line. Thus, in advancement of the tail section of this type of equipment, the motive power for advancement of the tail section must be sufficient not only to drive the tail section as such, but also sufficient to overcome the drag occasioned by maintenance of belt and strand tension through the tail section. This type of arrangement has therefore proven impractical and, for all practical purposes, inoperable due to the limitations thus placed on the mobility of the tail section.

It is likewise obvious that tension in the strands cannot be completely relaxed, for then the strands and idlers supported thereon would fall to the ground, as would strand supporting standards such as those of Patent 3,105,588, dated October 1, 1963, all which could result in serious misalignment of the conveyor line.

The primary object of this invention is the provision of a conveyor system including mobile conveyor line apparatus cooperatively interacting with the tail section in such a manner as to permit facile extension and retraction of strand and belting in accordance with movement of the tail section and maintenance of strand tension at a location adjacent to but separate from the tail section.

A further object is the provision of apparatus for use in association with strand supported conveyors including an improved tail section and mobile conveyor line apparatus cooperatively interacting therewith in such a manner that strand tension will be maintained through such mobile conveyor line apparatus during movement of the tail section and through the tail section during movement of the mobile conveyor line apparatus.

A further object is the provision of mobile conveyor line apparatus for use in association with strand supported conveyors, usually in an extensible conveyor system, which may be advanced in predetermined increments according to advancement of the tail section, and will function as a "tie-off" point for the strands of the conveyor.

A further object is the provision of mobile conveyor line apparatus for use in association with strand supported conveyors, of the type above described, which includes guide means for training the flexible strands of the conveyor as they are extended, thereby avoiding misalignment of the conveyor.

As the strands of the above described type of conveyor are extended, it is obvious that additional carrying idler rollers for supporting the conveying reach of the belt must be hung on the strands. Inasmuch as the belt sags somewhat between the idler supports thereof, the attachment of additional carrying idler rollers can be a somewhat difficult task. It is therefore a further object of my invention to provide mobile conveyor line apparatus for use in association with strand supported conveyors which includes means for facilitating the mounting of additional carrying idler rollers on extended flexible strands.

The primary reason for the provision of an extensible conveyor system is to permit the conveyor to be extended while the conveyor is in operation with the conveyor belt moving, usually while the conveying reach of the belt is loaded. My mobile conveyor line apparatus has been designed accordingly, including means for tying off loaded strands and means for facilitating the mounting of carrying idler rollers on the strands, all while the conveyor is operating. The invention is not however, to be construed as being limited to this type of extensible conveyor system, the same being applicable in connection with substantially all types of belt conveyor systems.

Other objects and advantages of the invention will be apparent during the course of the following detailed description, taken in connection with the accompanying drawings, forming a portion of this specification and in which drawings:

FIG. 1 is a top plan view somewhat diagrammatic, of my improved belt conveyor system.

FIG. 2 is an enlarged top plan view of an area adjacent the tail section of my improved belt conveyor system.

FIG. 3 is an enlarged side view of an area adjacent the tail section of my improved belt conveyor system.

FIG. 7 is an enlarged side view of my improved mobile conveyor line apparatus.

FIG. 8 is an enlarged end view of my mobile conveyor line apparatus, looking toward the right-hand end side of FIG. 2.

FIG. 9 is a sectional view taken substantially on the line 9—9 of FIG. 8.

FIG. 12 is a fragmentary sectional view taken substantially on the line 12—12 of FIG. 9.

FIG. 13 is an enlarged side elevation of a strand clamp of my apparatus, taken substantially on the line 13—13 of FIG. 12.

Figure 4:
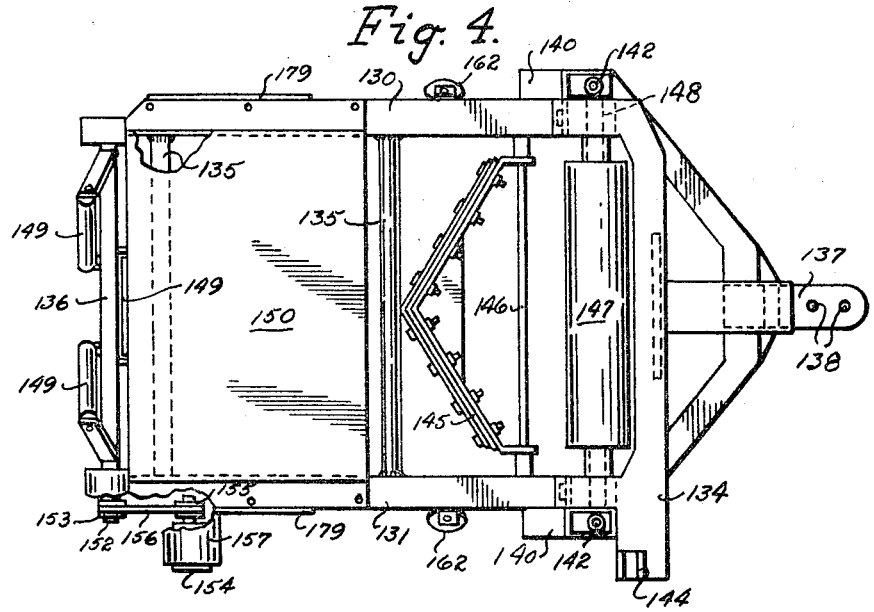
FIG. 4 is an enlarged top plan view of my improved tail section.

In the drawings, wherein for the purpose of illustration is shown a preferred embodiment of the invention, and wherein similar reference characters designate corresponding parts throughout the several views, the letter A may generally designate an extensible endless belt conveyor system; and B my improved mobile conveyor line apparatus, which includes a frame C, carrying idler roller means D mounted on the frame C, means E for supporting the return reach of the conveyor belt of the conveyor A, strand guide and aligning means F, clamp means G, means H for enabling and facilitating bodily movement of the frame C longitudinally of the strands of the conveyor A, ground engaging means J for locking the frame A at a given situs along the conveyor A, and means K for facilitating the mounting of carrying idler rollers on the strands of the conveyor A.

Conveyor system A preferably includes head section 15, usually positioned for discharge onto a main line conveyor 16, a belt take-up and storage unit 17; belt handling apparatus 18 for facilitating the insertion or removal of rolls of belting in the conveyor line; a feeder 19 for discharging a load onto the conveyor, a tail section 20; a flexible conveyor belt 21; flexible strands 22; standards 23 for supporting the strands 22; and carrying idler rollers 25 for supporting the conveying reach of belt 21.

Head section 15 and belt take-up and storage unit 17 may be of any approved type. They may, for instance, be of the type illustrated in my copending applications Serial No. 219,544, filed August 27, 1962, now Patent No. 3,146,878, and Serial No. 349,382, filed March 4, 1964.

Belt handling apparatus 18 comprises a device for the addition or removal of lengths of belting to the conveyor system. Such apparatus facilitates manipulation of the exceptionally heavy reels of belting into position so that lengths of belting on the reel can be properly added to the conveyor system in continuous extension of the same and to rewind belting upon the reel and facilitate removal of the same from the conveyor system in retraction of the same. Such belt handling apparatus may be of any approved type. It may, for instance, be of the type illustrated in Patent No. 2,933,177, dated April 19, 1960.

Feeder 19 may be of any approved type. It may be, for instance, of the type illustrated in Patent No. 2,984,333, dated May 16, 1961. As shown, feeder 19 preferably includes a frame $19^a$ mounted on crawlers $19^b$ having a power source (not shown) which enables advancement and retraction of feeder 19 and tail section 20 with respect to head section 15. Feeder 19 may include a boom $19^c$ which supports chain and flight conveyor $19^d$ for discharging a load onto belt 21 at tail section 20. Guide plates $19^e$ and $19^f$ having respective guide slots $19^g$ and $19^h$ are mounted on frame $19^a$, for a purpose which will be subsequently described. Hydraulic piston $19^i$, receiving power from feeder 19 is attached at one end thereof to frame $19^a$, for a purpose which will be subsequently described. Pivotally attached to frame $19^a$, preferably adjacent the line of center of crawlers $19^b$ is a drawbar $19^j$, the purpose of which will be subsequently described.

Standards 23 and carrying idler rollers 25 may be of any conventional type, for instance, of the type illustrated in Patent No. 2,896,774, dated July 28, 1959, or of the type illustrated in Patent No. 3,105,588, dated October 1, 1963.

Flexible strands 22 preferably comprise wire ropes, stored in rolls, and fed from the rolls as the strands are extended.

Frame C of my improved mobile conveyor line apparatus B preferably includes a pair of spaced apart side members 30 and 31, lower cross bars 32 and 33, and an intermedial cross bar 34. The side members 30 and 31 are spaced apart from each other, one adjacent each strand 22 with the cross bars 32, 33 and 34 extending therebetween. The cross bars 32, 33 and 34 may be welded or otherwise secured to each side member 30 and 31. A strand guide pipe 35 may be welded or otherwise attached to each side member 30 and 31. Guides 35 train strands 22 from the strand rolls (not shown) through the apparatus B, to pulley 27, in juxtaposition for facile extension, as will be subsequently described. A plate 36 is preferably welded or otherwise secured to and extending between cross bars 32 and 33, at a substantially central location between side members 30 and 31 for supporting the return idler roller means E, as will be subsequently described.

Means D may be in the form of any conventional carrying idler roller. The form illustrated herein comprises a carrying idler roller 25 which has been modified for mounting on the frame C. The means D illustrated thus includes a cross bar 37 which extends between side members 30 and 31, one end of the cross bar 37 being welded or otherwise secured to side member 30, and the other end of cross bar 37 being welded or otherwise secured to side member 31. Secured to cross bar 37 are brackets 39 which support wing rollers 40 and 41 and central roller 42, in the manner described in detail in the forementioned Patent No. 2,896,774.

Means D is preferably mounted on the frame C in such a position so that the conveying reach of belt 21 will, as it passes over means D, be elevated slightly above its normal path along carrying idler rollers 25 of the conveyor A. This slight elevation of the conveying reach of the belt 21 cooperates with means K in facilitating the mounting of the carrying idler rollers 25 on the flexible strands, as will be subsequently described.

Means E of apparatus B may comprise a conventional return idler roller, secured in a fixed position on frame C, or, as I have shown, a belt training idler assembly. The belt training idler assembly which I have shown preferably includes a cross bar 45, and bearing means 46 mounted at a substantially intermediate location of the cross bar 45, which bearing means is attached, such as by bolt assembly 47, to plate 36. This mounting permits pivotal movement of cross bar 45 intermediate cross bars 32 and 33 of frame C, about the bearing means 46. Upstanding side bracket 48 is fixedly secured to one end of cross bar 45 and an upstanding side bracket member 49 is secured to the other end of cross bar 45, which brackets 48 and 49 rotatably support therebetween idler roller 50. Brackets 52 and 53 are respectively secured to brackets 48 and 49. The brackets 52 and 53 are vertically movable with respect to their mounting brackets 48 and 49. A belt guide plate 55, somewhat in the nature of a semi-circular guard, is secured to the uppermost end of each bracket 52 and 53.

As the return reach of the belt 21 moves along idler roller 50, and if the same becomes misaligned toward one end or the other of idler roller 50, the same will abut against one or the other of the guide plates 55, which will cause the entire idler assembly to pivot about bearing means 46 in such a manner as to cant the idler roller 50 in a direction to re-align the return reach of the belt.

A rope guide means F is provided on each side member 30 and 31. These guide means F are identical, and identical reference characters have been applied to each.

Each rope guide means F preferably includes a pair of guide brackets 63 and 64, attached in an aligned spaced apart position to each of its respective side member 30 or 31; and a pair of cam rollers 65 and 66 attached, such as by bolt assemblies 68, in a spaced apart position to its respective side member 30 or 31. The brackets 63 and 64, and the cam rollers 65 and 66 of each side member 30 and 31 cooperatively interact with the strand 22 adjacent thereto for maintaining the alignment thereof, in accordance with the alignment of the remainder of the conveyor, as the apparatus is advanced in increments in accordance with the advancement of the tail section. This aligning means thus facilitates alignment of the advanced strand section with that which has gone before. The brackets 63 and 64 also prevent transverse misalignment of the strands 22, and the cam rollers 65 and 66, riding along the strands, facilitate vertical alignment of the strands.

Clamp means G provides means operable to lock apparatus B onto strands 22 at a predetermined location. In other words, when apparatus B has been moved to a position along the conveying run where it is desired to tie off strands 22, it is necessary to provide some means for locking strands 22 to apparatus B. Clamp means G provides the structure for this locked relationship.

Many types of wire rope clamps are available which would be readily adaptable for use in my invention. I have illustrated a clamp known as a "Klein Haven" (Klein improved Haven grip). A means G is attached to each side member 30 and 31.

The clamp means G illustrated preferably includes means 70 for clamping the wire rope and means 71 for operation of the means 70.

Means 70 preferably includes a main body portion 74, cam member 75, and operating lever 76.

The body portion 74 includes a strand grip portion 77, designed to contact the uppermost portion of the strand when the clamp is operated, and a loop portion 78 which supports the operating lever 76.

Cam 75 is pivotally mounted on body portion 74, such as by clevis pin 80, in an eccentric manner, so that strand gripping portion 81 of cam 75 will grip the lowermost portion of the strand when the clamp is operated. Grip portion 77 of body portion 74 and gripping surface 81 of cam 75 are juxtaposed with respect to each other to clamp a strand therebetween when the clamp is operated. Hook 82 is pivotally attached to clevis pin 80 and engages a projecting lug 83 of body portion 74 to brace the grip surfaces 81 and 77 in this gripping relationship to prevent dislodgment of the strand.

The means G of each side member 30 and 31 are virtually identical, the same being constructed so that the hook 82 of each lies next adjacent the side member to which it is attached with the lever 76 of each extending in the same direction. There will thus be a right hand means G and a left hand means G.

Lever 76 is pivotally secured to cam 75, such as by pin 84 and extends through the loop portion 78 of body portion 74. An actuating member receiving portion 85 is provided at the end of lever 76 opposite attachment to the cam 75.

Means 71 preferably comprises a handle portion 86 which is pivotally mounted, such as by pin 87, on the frame C. Handle 86 is disposed in a position whereby it may be readily accessible to the operator. Attached to pin 87 is an eccentric cam 88. Mounted upon eccentric 88, such as by pin 89, is a knob 90 which is received within the portion 85 of lever 76.

Handle 86 is provided with an opening 91, and has attached thereto a locking pin 92. Mounted adjacent the handle 86 is a pin receiving member 93 which receives the locking pin 92. The pin receiving member 93 is mounted in juxtaposition with respect to the handle 86 so that when the handle 86 is in a position with the clamp 70 fully locked about the strands, the opening 91 of handle 86 will be aligned with the opening of member 93, so that the pin 92 may be inserted through opening 91 and into the receiving member 93, securely locking the handle 86 in a fixed position.

Clevis pin 80 extends from body portion 74, through cam 75, through locking hook 82, and slidably supports means 70 in a slot 95 on a side member. The length of slide of the means 70 with respect to a side member is determined by the length of the slot 95 of a side member within which the clevis pin 80 is received. A spring 97 is secured at one end thereof to clevis pin 80, and at the other end thereof to frame C, the same serving to hold the means 70 at one end of the slot 95. Spring 97 holds clevis pin 80 at one end of slot 95 when means 70 is in its open position. When the handle 86 is operated to lock the means 70 about its adjacent strand, the eccentric cam 88 will reach a position at which the clamp means 70 is fully closed, but the handle 86 is not in a fully locked position. To move the handle 86 past this dead center position, it is necessary to provide for movement of the means 70 with respect to the frame C. Slot 95 permits such movement. Thus, in fully locked position, clevis pin 80 will be at the opposite end of slot 95 from that shown in FIG. 7. This will be a fully locked position.

Two means H are provided, one being attached to each side member 30 and 31.

Each means H preferably includes a spring assembly 100 and a wheel assembly 102. Each spring assembly 100 is of the leaf spring type, comprising a plurality of elongated flat spring members 103 attached together by means of brackets 104. Each spring assembly 100 is secured to its side member by a clamp bracket 105.

Each wheel assembly 102 preferably comprises a pair of wheels 108, one wheel being rotatably attached to each end of a spring assembly 100. Such rotatable attachment may be by means of a stub axle, or, as shown in the drawings, through axles 109 may be provided for interconnecting the opposed wheels of the side members.

The wheel assemblies 102 permit easy movement of the entire apparatus B longitudinally along the conveyor run. The spring assembly 100 permits vertical movement of the frame C with respect to the wheel assemblies 102, in cooperation with means J, as will be subsequently described.

It is obvious that some power means for tramming the apparatus B along the conveyor run could be supplied to the wheel assemblies 102. It was likewise obvious that some means for pulling the apparatus B could be attached to the tailpiece 20. However, we preferably move apparatus B by hand along the conveyor run.

Means J comprises, mainly, a pair of roof jack means 110, one of which is attached to each side member 30 and 31. Each jack means 110 are conventional mine roof jack assemblies, including a frame 111 welded or otherwise secured to a side member, threaded shaft portion 113 and operating handle portion 114. Rotation of the operating portion 114 engages the threads of member 113, moving the head 112 into and out of engagement with the mine roof.

A skid plate 115 is welded or otherwise attached to the bottom of each side member 30 and 31. The skid plates 115 cooperate with the roof jacks 110 in locking the apparatus B at a given location along the conveyor run. This operation is as follows:

When the operating lever 114 is rotated in a manner to elevate the head 112 into contact with the mine roof, it is obvious that continued pressure of the head 112 against the mine roof will force the frame C down upon spring assembly 100, so that the skids 115 come into contact with the ground floor, as shown in full lines in FIG. 3. Thus, with the head 112 abutting the mine roof, and the skids 115 abutting the ground floor, the apparatus B is secured in a fixed position on the conveyor run. Now, when it is desired to move the apparatus B in accordance with movement of the tail section 20, the roof jacks 110 will be lowered, out of engagement with the mine roof, and the spring assemblies 100 will elevate the frame C so that the skids 115 no longer contact the ground floor, and the entire apparatus B may then be easily moved along wheel assemblies 102.

Figure 14:
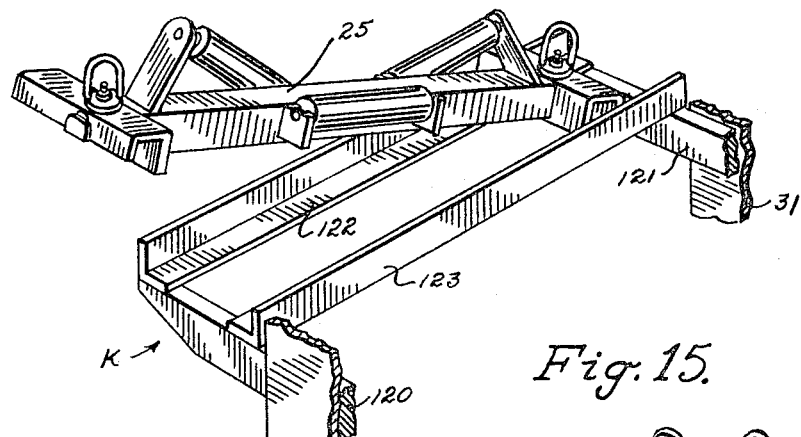
FIGS. 14 and 15 are perspective views illustrating the means of my apparatus which facilitates the mounting of carrying idler rollers on the strands of the conveyor.
Figure 15:
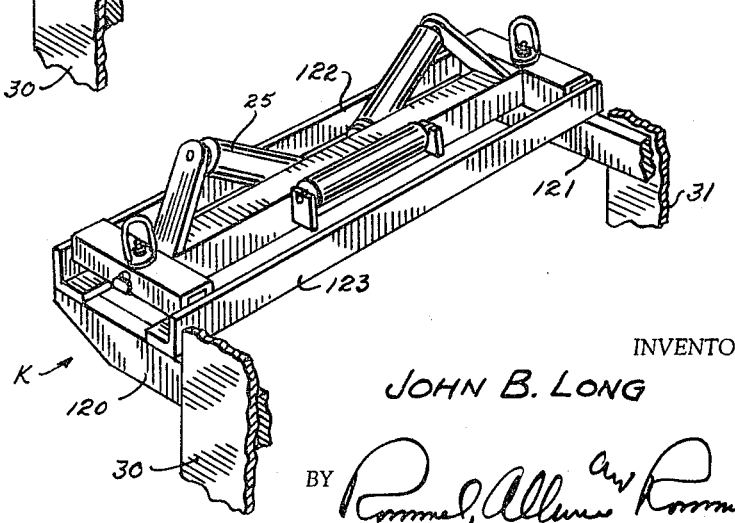

Means K preferably includes a pair of horizontally extending support members 120 and 121, the member 120 being welded or otherwise secured in a fixed position upon side member 30, and the member 121 welded or otherwise fixedly secured upon the side member 31. The members 120 and 121 extend outwardly to one end of frame C, in longitudinal parallel alignment with the strands 22. A pair of substantially L-shaped cross bars 122 and 123 are mounted upon and extend transversely between bars 120 and 121. The members 122 and 123 confront each other with the open end of the L of each facing the other, providing a track means for receiving a carrying idler roller 25. As shown in FIGS. 14 and 15, the carrying idler roller 25 may be easily slid along bars 122 and 123, interfitting therewithin to a final position substantially as shown in FIG. 2. Thus, a carrying idler roller 25 can be carried by the frame C, and when the same is positioned at a point where it is desired to attach one of the carrying idler rollers to the strands 22, the same can be easily raised and hung in transverse conveying relationship between the strands 22. The fact that the carrying idler roller assembly D of the apparatus B is elevated slightly above the normal conveying reach of belt 21, raises the belt 21, at the point of attachment of the carrying idler 25 from the means K, so that the same can be easily attached to the strands 22.

It is to be specifically noted that return idler roller 50 of means E of mobile conveyor line apparatus B is preferably positioned to slightly raise the return reach of belt 21 vertically above the normal run which it follows over the remainder of the return rollers in the system. Thus, additional space is provided below the return reach adjacent mobile conveyor line apparatus B for insertion therebeneath of additional return reach supporting idler rollers as the conveyor is extended.

Likewise, conveying reach idler rollers 40, 41 and 42 of carrying idler roller means D of mobile conveyor line apparatus B are preferably spaced from idler roller 50 of means E thereof to provide a wider than normal vertical separation between the conveying and return reaches of the belt adjacent mobile conveyor line apparatus B. This additional vertical spacing between the reaches facilitates the placement of carrying idler rollers 25 beneath the conveying reach of the belt and intermediate the conveying and return reach as the conveyor is extended.

It is likewise obvious that the added vertical spacing adjacent mobile conveyor line apparatus B, as noted above, might be utilized in facilitating removal of return idlers and carrying idlers as the conveyor is retracted.

As is known in the art, it is desirable to provide a belt aligning roller for the return reach adjacent the loading point of the conveyor system. To accomplish this, past practice has been to provide a self-aligning roller on the tail section. However, since the tail section is subject to continuous shock loads as material is discharged thereonto, and inasmuch as some buildup of spilled material from the tail section is unavoidable, such tail section self-aligning rollers are frequently rendered inoperative. The provision of a self-aligning roller means on mobile conveyor line apparatus B obviates the necessity of a self-aligning roller on the tail section.

Tail section 20 preferably comprises a frame including a pair of side members 130 and 131, each of these side members including a supporting skid 132 at one end thereof and a supporting stand 133 at the other end thereof; a transverse end plate 134 at the end thereof to be attached to feeder 19; a plurality of cross braces 135; and an idler roller supporting cross brace 136 at the opposite end thereof from end plate 134.

Figure 5:
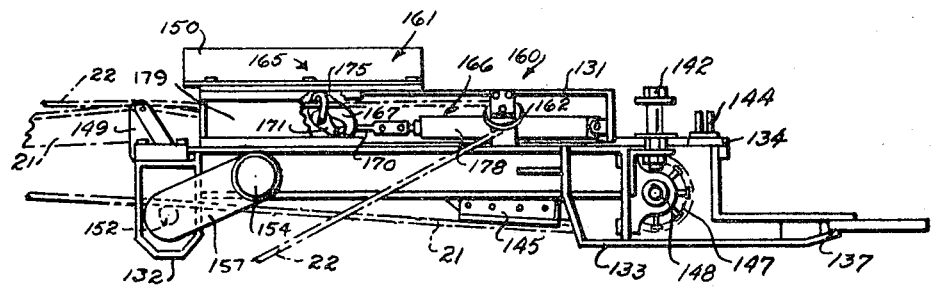
FIG. 5 is an enlarged side view of my improved tail section.
Figure 6:
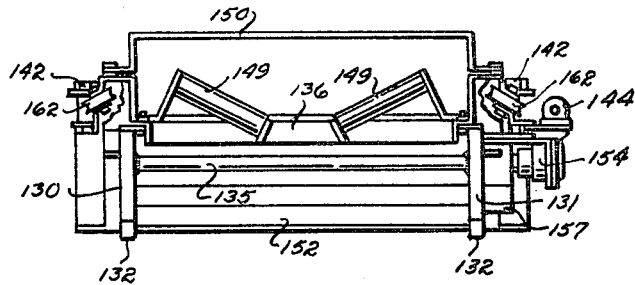
FIG. 6 is an enlarged end view of my improved tail section.

As illustrated in FIGS. 2, 3 and 5, a tongue 137 is attached to end plate 134 and supporting stand 133. Tongue 137 is provided with bolt receiving openings 138 for attachment to drawbar 19$^j$ of feeder 19 by bolts 138, as shown in FIGS. 2 and 3.

Outwardly extending plates 140 are attached to each side member 130 and 131, each plate 140 having attached thereto a pivot pin 142. One pivot pin 142 is received in guide slot 19$^g$ of feeder 19 and the other pivot pin 142 received in guide slot 19$^h$ of feeder 19.

Lug 144 is mounted on one end of end plate 134, to which lug 144 is interconnected one end of hydraulic piston 19$^i$.

It will thus be observed that the relationship between feeder 19 and tail section 20 is such that, by actuation of hydraulic piston 19$^i$, tail section 20 can be pivotally situated with respect to feeder 19 and with respect to the main conveyor run, being pivoted through drawbar 19$^j$ and guided in such pivotal movement by interaction of pivot pin 142 in guide slots 19$^g$ and 19$^h$, so that tail section 20 can be aligned with the conveyor run. Likewise, through interconnection of tail section 20 to feeder 19 by the yoke or guide plates 19$^e$ and 19$^f$, through pivot pins 142 received by guide slots 19$^g$ and 19$^h$, tail section 20 can be raised or lowered by raising and lowering boom 19$^c$ of feeder 19.

A conventional belt wiping assembly 145 is pivotally mounted on shaft 146 extending transversely between side members 130 and 131.

Belt direction reversing roller 147 is mounted on shaft 148, extending transversely between side members 130 and 131 adjacent the end thereof nearest feeder 19 and belt training idlers 149 are mounted on cross brace 136.

Cover plate 150 extends transversely between side members 130 and 131 intermediate roller 147 and training idlers 149. Cover plate 150 materially reduces the amount of dust generated at the transfer point of coal from feeder 19 to the belt when this equipment is used in coal mining operations. It is obvious that cover plate 150 might be removed for conveying other types of material.

A roller 152 having a sheave 153 at one end thereof extends transversely between the supporting skid 132 of side member 130 and the supporting skid 132 of side member 131. Roller 152 is positioned so that the lowermost portion of the return reach of the conveyor belt abuts thereagainst, rotating roller 152 in accordance with the rate of movement of the conveyor belt riding therealong. An electrical centrifugal switch 154 is mounted on side frame 131 and is interconnected with sheave 153 by a sheave 155 and V-belt 156. This electrical centrifugal switch 154 is conventional, being interconnected to the power source of feeder 19 so that in the event the conveyor belt slows down or stops, the feeder will be stopped. Such switch 154 is provided to prevent the feeder from discharging material onto the conveyor belt when it isn't running. Guard plates 157 may be provided about centrifugal switch 154 and the moving parts thereof in order to guard against injury to workers.

Mounted on each side member 130 and 131 is a strand guide means 160 and strand clamp means 161.

Each strand guide means 160 preferably includes a sheave 162 which is disposed with respect to the conveyor line to receive a wire strand 22 through the uppermost portion thereof and guides the same from the conveyor line, through strand clamp means 161 and thence outwardly away from interference with the conveyor such as by way of guides 35 back to the strand rolls.

Each strand clamp means 161 preferably includes means 165 and means 166 for operation of the means 165.

Clamp means 165 may comprise a "Klein Haven" (Klein improved Haven grip) clamp such as clamp means G previously described in connection with mobile conveyor line apparatus B. Clamp means 165 preferably includes a main body portion 167 having a strand grip portion designed to contact the uppermost portion of the strand when the clamp is operated, and a loop portion which supports an operating lever 170; and a cam member 171 pivotally mounted on body portion 167 by a clevis pin, in an eccentric manner, so that strand gripping portion of cam 171 will grip the lowermost portion of the strand when the clamp is operated. The grip portion of body portion 167 and the gripping surface of cam 171 are juxtaposed with respect to each other to clamp a strand therebetween when the clamp is operated. Hook 175 is pivotally attached to the clevis pin and engages a projecting lug of body portion 167 to brace the grip surface in gripping relation to prevent dislodgment of the strand, all as previously described with respect to means G.

The clevis pin, in addition to serving as above described is attached at one end thereof to its adjacent side member, supporting clamp means 165 thereon.

Lever 170 is pivotally secured to cam 171, and extends through the loop portion of body portion 167 for attachment to means 166.

Each operating means 166 preferably comprises a hydraulic piston 178 interconnected at one end thereof to its adjacent side member and interconnected at the opposite end thereof to a lever 170.

A guard plate 179 may be provided to form a protective cover over each clamp means 161.

Assuming that the system has been set up for operation as illustrated in FIG. 1, with strands 22, standards 23 and idler rollers 25 in place; head section 15, feeder 19, tail section 20 and mobile conveyor line apparatus positioned; and belting added from belt handling apparatus 18 and stored for extension and retraction on belt take-up and storage unit 17, the operation of the system will be as follows:

As illustrated in FIG. 1, the system is positioned for further extension thereof by movement of feeder 19 away from head section 15, with mobile conveyor line apparatus adjacent tail section 20.

The means J of apparatus B is fully operative, with the head 112 in abutment with the mine roof and the skids 115 in abutment with the mine floor, fixedly securing the apparatus B at a given location. The means G of apparatus B is likewise in full operation, with the frame C locked onto the strands 22 of the conveyor. The ends of the strands 22 adjacent the tailpiece are thus securely tied off. The ends of strands 22 adjacent the head section of the conveyor will be "tied off" to the ground in a conventional manner. They may be "tied off" in a manner such as that shown in FIGS. 1e and 2e of the aforementioned Patent No. 3,107,776. At this position, the "continuous miner," or other apparatus attached to the tail section 20 is operated, and the conveyor belt is rotatably operated. As the tail section 20 is advanced, away from apparatus B, it moves further and further away from the tie-off points of the strands, at the apparatus B. After the tail section 20 has been advanced a considerable distance, so that belt sag between the tail section 20 and the apparatus B is appreciable, and has reached a point where the conveying reach of the belt intermediate the apparatus B and the tail section 20 requires additional support, the apparatus B is moved toward tail section 20. Such movement may take place while the conveyor A is still in operation, so that no mining time is lost during this movement.

When it is thus desired to move apparatus B toward tail section 20, clamp means 165 is actuated by operating means 166, clamping strands 22 at tail section 20 in juxtaposition to maintain proper strand tension when clamp means G of apparatus B are released.

Figure 10:
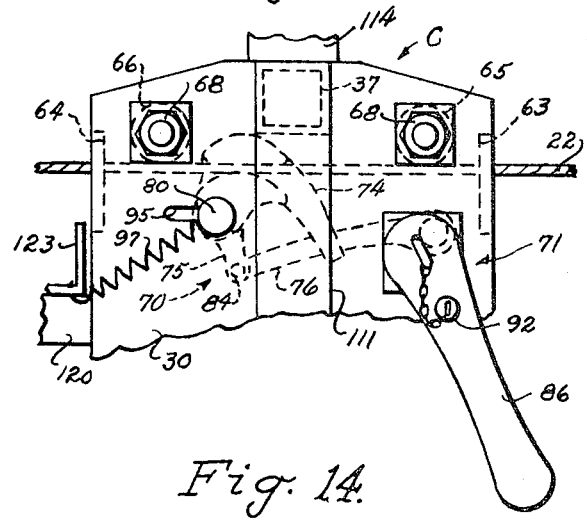
FIG. 10 is an enlarged fragmentary view of the upper portion of the apparatus of FIG. 7.
Figure 11:
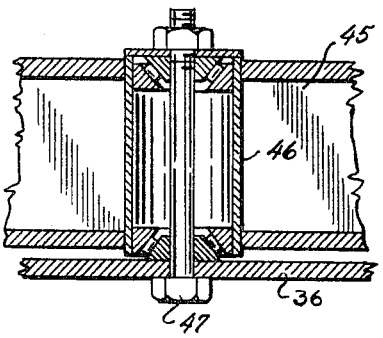
FIG. 11 is a sectional view taken substantially on the line 11—11 of FIG. 8.

After clamp means 165 is actuated, clamp means G of apparatus B is released, by movement of the handle 86 from the position as shown in FIG. 10 to the position as shown in FIGS. 3 and 9. The means J of apparatus B is then operated, lowering the mine jack heads 112 from their contact with the mine roof, while the springs 100 raise the skids 115 from contact with the ground floor.

Assuming that a carrying idler roller 25 has previously been placed within the means K of apparatus B, the entire apparatus B is then advanced toward the tail section 20, to a position where the next carrying idler should be attached to the strands 22. These carrying idler rollers are usually spaced approximately twelve feet apart, so that this next mounting of the carrying idler roller 25 will approximately be twelve feet from that carrying idler roller 25 which had been previously mounted on the strands 22. Carrying idler roller 25 is then lifted from the means K of apparatus B, and securely attached to and transversely between the strands 22. The apparatus B is then moved forwardly a slight distance, and another carrying idler roller 25 is slid into the means K of apparatus B. This procedure is continued, with insertion of additional carrying idler rollers, until the apparatus B is again adjacent tailpiece 20. Of course, standards 23 will be attached as desired, intermediate the carrying idler rollers 25, as apparatus B is moved toward tailpiece 20.

As shown in FIG. 3, apparatus B has been advanced to adjacent tail section 20 and means J operated. Means G has not yet been operated. In FIG. 3, drawing restrictions required that the conveying reach of the belt, intermediate tail section 20 and apparatus B, be shown at an exaggerated angle of inclination. In reality, such inclination would be quite slight and might be entirely eliminated by appropriate height proportioning of apparatus B with respect to tail section 20.

On particularly uneven terrain, or when working at an inclined position, it may be desirable to fixedly secure the frame C in position, by operation of means G and J when the carrying idlers 25 are mounted on strands 22.

When the apparatus B has been advanced to adjacent tailpiece 20, means J of the apparatus B is operated, raising the jack heads 112 into contact with the mine roof and lowering the skids 115 into contact with the ground floor, and means G operated, clamping strands 22 to apparatus B. Thus, the apparatus B is again in position to serve as a tie-off point for the ends of the strands adjacent the tail section 20. Clamp means 165 is released and tail section 20 may again be freely advanced.

These advancing steps of apparatus B may be consecutively continued along the entire length of the conveyor run, as necessary.

In retraction of the feeder 19 toward head section 15, the reverse procedure would be followed, as is obvious.

Although I have described my improved apparatus mainly with respect to its use in mining operations, it is obvious that the same may be utilized in association with all types of strand supported conveyors, whether above or below ground, and the same should not be construed as being limited to mining operations. It is obvious that the means J of apparatus B could be appropriately modified in the case of above ground installations or where it would not be feasible to provide roof jacks for fixing the frame C at a given location. It is likewise obvious that means H could be modified so that coil springs or other spring means may be used in lieu of the leaf springs shown and described.

Various changes in the shape, size and arrangement of parts may be made to the form of invention herein shown and described, without departing from the spirit of the invention or the scope of the following claims.

I claim:

1. In strand supported conveyor systems including the combination of a head section and a tail section, said tail section being movable toward and away from said head section in extension and retraction of the conveyor, mobile conveyor like apparatus for anchoring the strands of the conveyor system adjacent to and spaced apart from said tail section, said apparatus including a frame; means mounted on said frame for enabling and facilitating bodily movement of said frame in longitudinal alignment with the strands of the strand supported conveyor, said last mentioned means including spring means attached to said frame and wheel means attached to said spring means, said spring means and said wheel means being juxtaposed with respect to said frame to permit vertical movement of said frame on said spring means and with respect to said wheel means; ground engaging means mounted on said frame for locking said frame at a given ground location, said ground engaging means including means for causing abutment of said frame means with the surface upon which said wheel means rides whereby actuation of said ground engaging means renders said frame immobile; and clamp means mounted on said frame, said clamp means including means operable to lock the strands of the strand supported conveyor onto said frame.

2. Apparatus as specified in claim 1 which is designed for operation intermediate a floor and a roof, said wheel means riding on the floor surface thereof, and said ground engaging means includes jack means mounted on said frame means, said jack means including means operable to abut against the roof surface and position said frame in abutment with the floor surface.

3. In apparatus for use in association with strand supported conveyors, the combination of a frame, said frame including idler means mounted thereon for supporting the conveying reach of the belt of the strand supported conveyor above the normal bed of the belt along the carrying idler rollers supported on the strands of the strand supported conveyor; means mounted on said frame for enabling and facilitating bodily movement of said frame in longitudinal alignment with the strands of the strand supported conveyor; and carrying idler support means mounted on said frame, said carrying idler support means including track means for receiving a carrying idler roller which is to be strand mounted, said track means being juxtaposed with respect to said frame so that the carrying idler roller supported thereon is at a location below the conveying reach of the belt of the strand supported conveyor.

4. Apparatus as specified in claim 3 including return idler roller means mounted on said frame in juxtaposition with respect to the normal return reach of the conveyor whereby to vertically raise the return reach above the normal run thereof for facilitating insertion and removal of additional return idler roller means beneath the return reach of the conveyor.

5. In an extensible conveyor system which includes a strand supported conveyor having a head section; a tail section; and mobile conveyor line apparatus including a frame having means mounted thereon for enabling and facilitating bodily movement of the frame in longitudinal alignment with the strands of the strand supported conveyor, means mounted on the frame for locking the frame at a given ground location, and means operable to lock the frame onto the strands of the strand supported conveyor, the method of extending the conveyor system which includes the locking of the frame of the appartus at a given position along the conveyor run, locking the strands of the strand supported conveyor to the apparatus, advancing the tail section away from the head section in given increments, and after the tail section has been moved away from the head section a predetermined distance, clamping the strands of the strand supported conveyor to the tail section and tensioning the same, unlocking the apparatus from the strands of the strand supported conveyor, releasing the apparatus from its locked position along the conveyor run, moving the apparatus along the conveyor to a position adjacent the tail section of the conveyor, mounting carrying idler rollers on the strands of the strand supported conveyor at predetermined points along the conveyor run between the advanced position of the apparatus adjacent the tail section and its previous position, again locking the frame of the apparatus at a given ground location, locking the strands of the strand supported conveyor to the apparatus, and releasing the strands from the tail section.

6. The method as specified in claim 5 wherein the apparatus includes means for supporting carrying idler rollers, and the steps include successive placement of carrying idler rollers on the apparatus as it moves from its initial position to a position adjacent the tail section, and such carrying idler rollers are consecutively attached to the strands at predetermined positions as the apparatus is moved from its initial position to the position adjacent tail section of the conveyor.

7. In a belt conveyor system including a head section, tail section, endless conveyor belting orbitally entrained between said head section and said tail section, a plurality of flexible strands providing support for the conveying reach of said conveyor belting, and means whereby the conveyor may be extended and retracted by movement of said tail section toward and away from said head section, the combination of mobile conveyor line apparatus mounted in the conveyor line intermediate said head section and said tail section, said apparatus including means for anchoring said flexible strands under appropriate tension adjacent to and spaced apart from said tail section in juxtaposition whereby said tail section may be advanced and retracted independently of the maintenance of appropriate tension of said flexible strands, said apparatus including means for movably positioning said apparatus in appropriate adjacent spaced apart position with respect to said tail section, and means mounted on said tail sction for clamping said flexible strands and maintaining appropriate tension thereon during positioning of said apparatus.

8. In a belt conveyor system including a head section, tail section, endless conveyor belting orbitally entrained between said head section and said tail section, a plurality of flexible strands providing support for the conveying reach of said conveyor belting, and means whereby the conveyor may be extended and retracted by movement of said tail section toward and away from said head section, the combination of mobile conveyor line apparatus mounted in the conveyor line intermediate said head section and said tail section, said apparatus including means for anchoring said flexible strands under appropriate tension adjacent to and spaced apart from said tail section in juxtaposition whereby said tail section may be advanced and retracted independently of the maintenance of appropriate tension of said flexible strands, said apparatus including means for movably positioning said apparatus in appropriate adjacent spaced apart position with respect to said tail section, and means adjacent the tail section end of the strands for clamping said flexible strands and maintaining appropriate tension thereon during positioning of said apparatus.

9. In a belt conveyor system including a head section, tail section, endless conveyor belting orbitally entrained between said head section and said tail section, a plurality of flexible strands, a plurality of carrying idlers mounted on said flexible strands for supporting the conveying reach of said conveyor, and means whereby the conveyor may be extended and retracted by movement of said tail section toward and away from said head section, the combination of mobile conveyor line apparatus mounted in the conveyor line intermediate said head section and said tail section, said apparatus including a frame, wheel means for supporting said frame for movement intermediate said head section and said tail section independently of movement of said tail section, and carrying idler support means mounted on said frame, said carrying idler support means including track means for receiving a carrying idler roller, said track means being disposed in the conveyor line in juxtaposition to receive carrying idler rollers for the facile insertion and removal thereof in the conveyor line.

10. In an extensible conveyor system which includes a strand supported conveyor having a head section, tail section, and mobile conveyor line apparatus positioned adjacent the tail section, such apparatus including a frame having wheel means for enabling and facilitating bodily movement of the frame in the conveyor line, and means for supporting carrying idler rollers, the method of extending and retracting the conveyor system which includes, in retraction of the conveyor line, moving the mobile conveyor line apparatus from adjacent the tail section to the carrying idler roller next adjacent thereto, removing such carrying idler roller from the strands onto the means for supporting carrying idler rollers of the mobile conveyor line apparatus, removing the carrying idler roller from the means for supporting the carrying idler rollers of the mobile conveyor line apparatus and depositing the same outside of the conveyor line, and successively moving the mobile conveyor line apparatus away from the tail section to the next successive carrying idler roller and removing such carrying idler roller first onto the means for supporting carrying idler rollers of the mobile conveyor line apparatus and then off the means for supporting carrying idler rollers of the mobile conveyor line apparatus until a sufficient number of carrying idler rollers have been removed from the conveyor line for the designed retraction of the tail section, and, in extension of the conveyor line, advancing the tail section away from the head section the desired distance, and after the tail section has been thus moved away from the head section the desired distance, moving the mobile conveyor line apparatus toward the tail section and consecutively placing carrying idler rollers on the means for supporting carrying idler rollers of the conveyor line apparatus and thence to the strands of the strand conveyor as the conveyor line apparatus is moved from its initial position to a new position again adjacent the tail section of the conveyor.

References Cited by the Examiner

UNITED STATES PATENTS

| | | | |
|---|---|---|---|
| 2,858,933 | 11/1958 | Hardy | 198—139 |
| 2,897,564 | 8/1959 | Hardy | 198—139 X |
| 3,105,588 | 10/1963 | Long | 198—192 |
| 3,107,776 | 10/1963 | Long | 198—89 |

EVON C. BLUNK, *Primary Examiner.*

EDWARD A. SROKA, *Examiner.*

UNITED STATES PATENT OFFICE
CERTIFICATE OF CORRECTION

Patent No. 3,268,060                                August 23, 1966

John B. Long

It is hereby certified that error appears in the above numbered patent requiring correction and that the said Letters Patent should read as corrected below.

Column 11, line 12, for "like" read -- line --; column 12, line 26, after "adjacent" insert -- the --; line 46, for "sction" read -- section --.

Signed and sealed this 1st day of August 1967.

(SEAL)
Attest:

EDWARD M. FLETCHER, JR.                         EDWARD J. BRENNER
Attesting Officer                                      Commissioner of Patents